Aug. 18, 1925.  
W. C. DONALDSON  
1,550,063  
AUTOMATIC CONTROL FOR ELECTRIC HEATERS, COOKERS, OR THE LIKE  
Filed Nov. 21, 1923  2 Sheets-Sheet 1
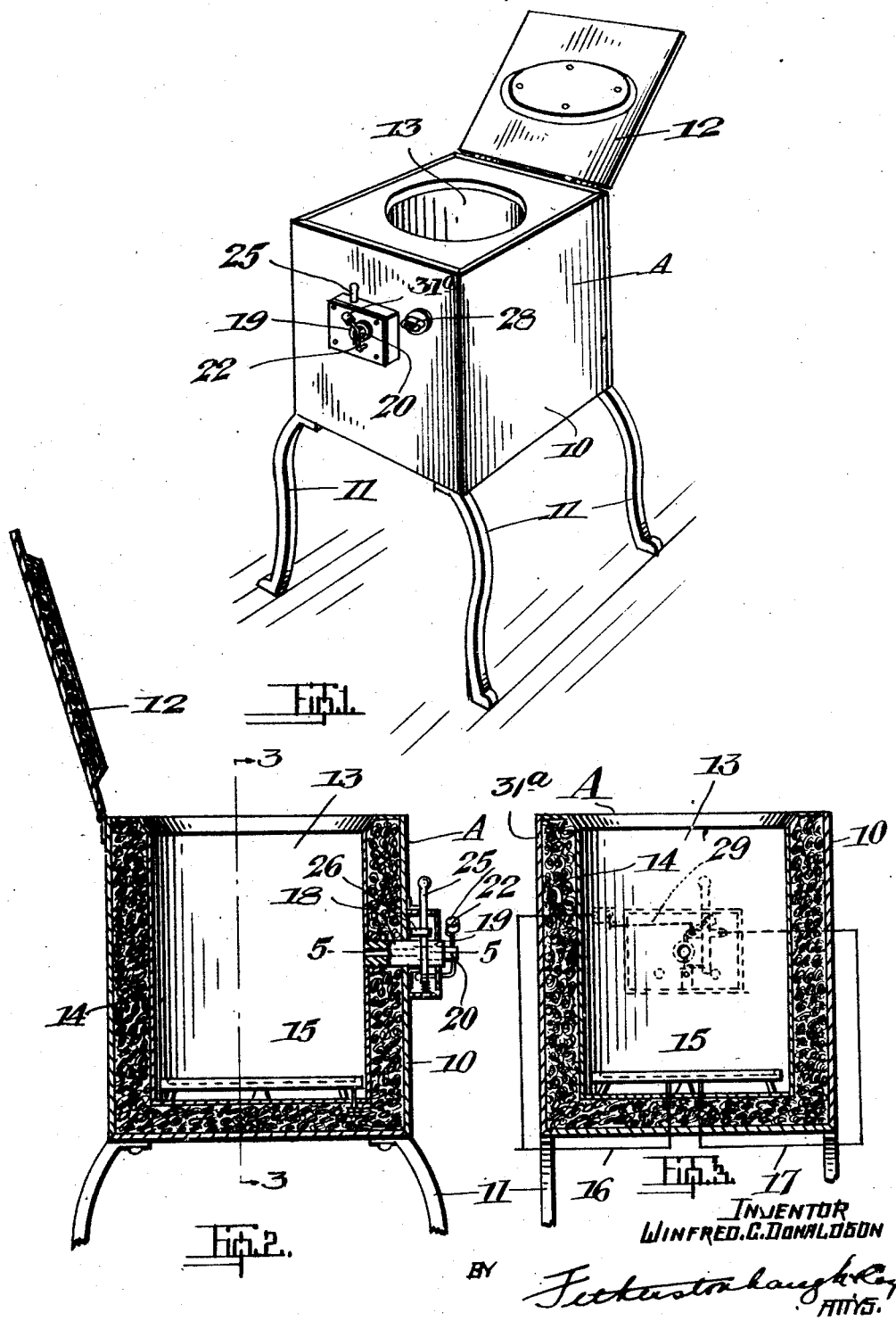
INVENTOR  
WINFRED. C. DONALDSON  
BY  
ATTYS.

Aug. 18, 1925.  
W. C. DONALDSON  
1,550,063  
AUTOMATIC CONTROL FOR ELECTRIC HEATERS, COOKERS, OR THE LIKE  
Filed Nov. 21, 1923  2 Sheets-Sheet 2

INVENTOR  
WINFRED. C. DONALDSON.  
BY *[signature]*  
ATTYS.

Patented Aug. 18, 1925.

1,550,063

UNITED STATES PATENT OFFICE.

WINFRED CROMWELL DONALDSON, OF OTTAWA, ONTARIO, CANADA.

AUTOMATIC CONTROL FOR ELECTRIC HEATERS, COOKERS, OR THE LIKE.

Application filed November 21, 1923. Serial No. 676,126.

*To all whom it may concern:*

Be it known that I, WINFRED CROMWELL DONALDSON, a subject of the King of Great Britain, and resident of the city of Ottawa, in the Province of Ontario and Dominion of Canada, have invented certain new and useful Improvements in Automatic Controls for Electric Heaters, Cookers, or the like, of which the following is a specification.

This invention relates to improvements in automatic controls for electric heaters, cookers, or the like, and the objects of the invention are to provide a simply constructed and effective device of this character that can be readily fitted to an electric cooker or the like and in which the several parts will more satisfactorily perform the various functions required of them.

Further objects are the provision of a device of this character that will be easy to construct and which can be fitted to existing heaters at comparatively low cost.

With the foregoing and other objects in view, the invention consists essentially in the novel construction and arrangement of parts as described in the present specification and illustrated by the accompanying drawings that form part of the same.

Referring now to the drawings, in which like characters of reference indicate corresponding parts in each figure, Figure 1 is a perspective view of an electric cooker fitted with my improved device.

Figure 2 is a vertical section of the cooker.

Figure 3 is a section on the line 3—3 of Figure 2, with wiring shown outside for the sake of clarity.

Figure 4:
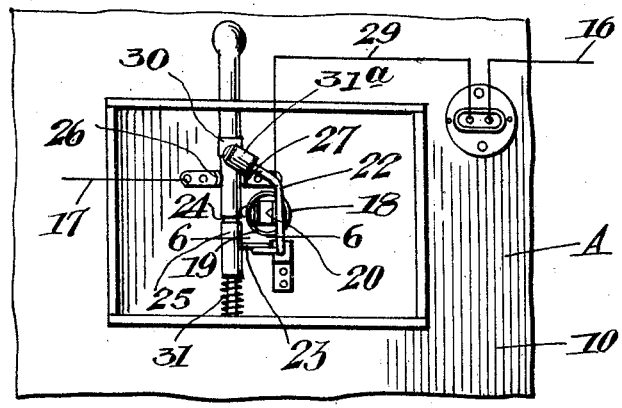
Figure 4 is a plan view of the control mechanism.

In the drawings, an embodiment of my device is shown in connection with an electric cooker A of any well known construction and here illustrated as comprising a cabinet 10 mounted on suitable supports or legs 11 and provided with a hinged cover or lid 12.

13 is the container or oven surrounded by a suitable packing 14 and designed to be heated by the element 15 connected to the control mechanism by the wires 16 and 17, which are illustrated, for the sake of clarity, outside of the packing 14, though in the usual construction these wires extend through the packing.

Figures 5, 6:
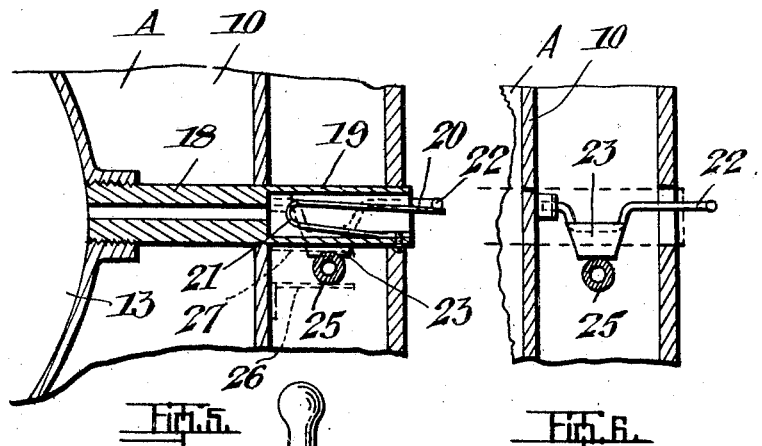
Figure 5 is a section on the line 5—5 of Figure 2.
Figure 6 is a section on the line 6—6 of Figure 4.
Figure 7:
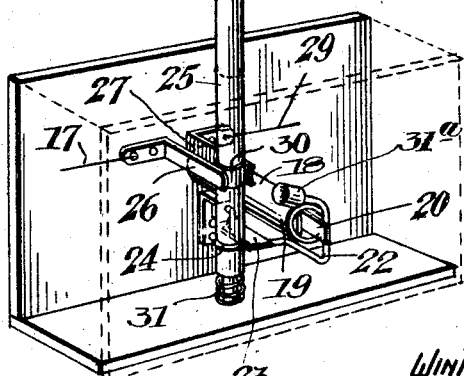
Figure 7 is a perspective detail of the control mechanism, with casing in dotted lines.

Referring now more particularly to the automatic control means, this consists of a tube 18 extending into the container 13 and provided at its outer end with a projecting sleeve 19 of larger diameter than the tube. Within this sleeve is mounted a strip 20 of thermostatic metal bent longitudinally on itself at 21 to be slipped into the tube, as shown in Figure 5, one end of the strip extending to connect with an operatively mounted arm 22. This arm is suitably bent and provided with a contact plate 23 to engage with a slot 24 in a spring actuated vertical member 25 slidably retained in position between a pair of bracket members 26 and 27 to which the leads 17 and 29 are, respectively, connected. This vertical member is provided with a copper contact plate 30 so arranged that when the plate 23 engages with the slot 24 the vertical member is held and the plate 30 contacts with the bracket members, completing the circuit.

On the cooker becoming heated to a predetermined temperature, caused by the boiling of the food or contents in the cooker and sufficiently to result in steam passing through the tube, the strip 20 is expanded, causing the arm 22 to move, releasing the plate 23 from engagement with the vertical member and permitting the latter to move upwardly by the action of the spring 31, bringing with it, out of contact with the brackets, the contact plate 30, thus automatically opening the circuit.

Referring to the wiring, the lead 17 connects the heating element with one of the contact bracket members 27 supporting the member 25, while the lead 16 connects the heating element 15 with the electric service plug 28 and the lead 29 connects the electric service plug 28 with the other element 26 of the supporting bracket.

31ª is a suitable cap on the extremity of the arm 22, whereby it can be manually operated to open the electric circuits, when necessary.

As many changes could be made in the above construction and many apparently widely different embodiments of my invention, within the scope of the claims, constructed without departing from the spirit or scope thereof, it is intended that all matter contained in the accompanying specification and drawings shall be interpreted as illustrative and not in a limiting sense.

What I claim as my invention is:

1. In an electric fireless cooker and in combination, an oven, means for heating the oven, a tube communicating with the oven and with the atmosphere, a temperature responsive spring strip bent on itself within said tube, in the path of the heat from the oven and means operable by said strip for regulating the heating means.

2. The device as claimed in claim 1 in which the temperature responsive strip comprises a length of spring material folded on itself unevenly and adapted to be fitted within the tube in the path of the heated fluid and air from the oven and having one end projecting beyond the tube to connect with a switch operating arm whereby on the strip being expanded by the heat from the oven passing through the tube, the switch operating arm is operated to open a switch.

3. In an electric fireless cooker and in combination, an oven, means for heating the oven, a conduit connecting the oven with the atmosphere, a temperature responsive strip of resilient material bent unevenly on itself within said conduit in the path of the heat from the oven and extending beyond the conduit, a switch operating arm connected to the extended end of said strip whereby on the strip being expanded by the heat from the oven passing through the tube, the arm is operated to open a switch.

4. The device as claimed in claim 1 in which the device for regulating the heating means comprise a spring actuated switch normally held in open position, a slot in the switch member, an arm connected at one end to the temperature responsive strip and adapted at the other end to engage with said slot whereby the switch is closed and whereby on the temperature responsive strip expanding the arm is operated to open the switch.

5. In a device of the character described, the combination with an oven and means for heating the oven of means for controlling the heating of the oven comprising a spring actuated switch normally held in open position, a conduit connecting the oven with the atmosphere, a sleeve on the outer end of the conduit of greater diameter than the conduit, a temperature responsive strip unevenly bent upon itself and inserted within the conduit, directly in the path of the heat passing through the conduit from the oven and having one end extending beyond said sleeve to connect with said switch whereby on the strip being expanded the closed switch is opened.

In witness whereof I have hereunto set my hand.

WINFRED CROMWELL DONALDSON.